Oct. 2, 1945.   A. Y. DODGE   2,385,799
ONE-WAY CLUTCH
Filed March 19, 1943
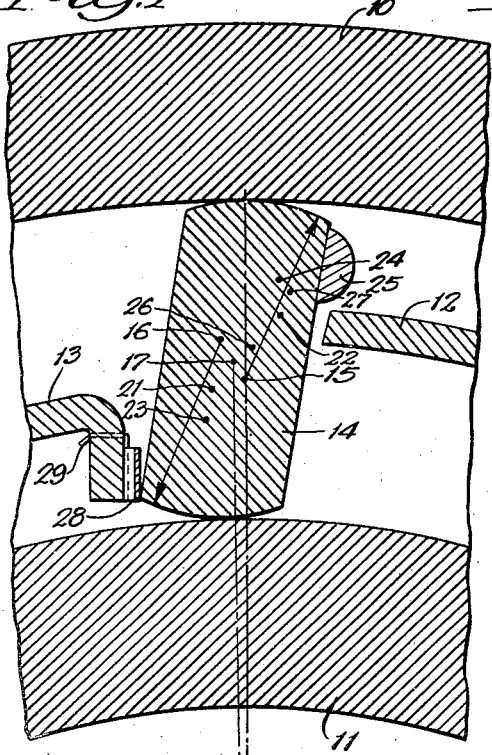
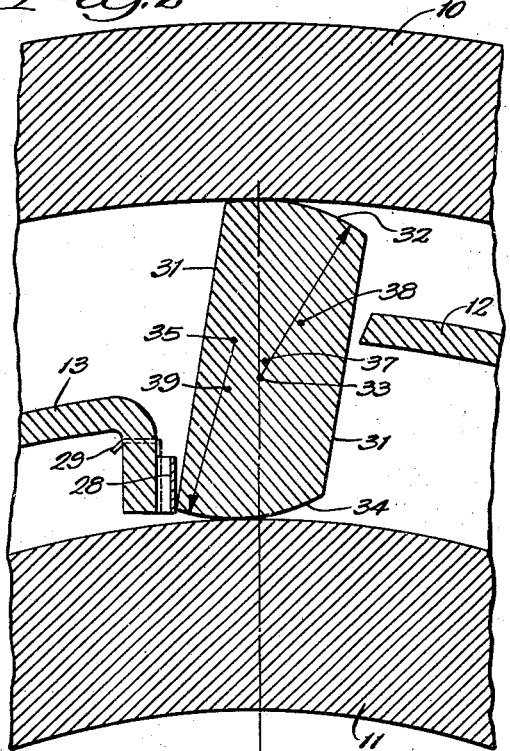
Inventor:
Adiel Y. Dodge,
By Dawson, Ormsby Booth
Attorneys.

Patented Oct. 2, 1945

2,385,799

UNITED STATES PATENT OFFICE 2,385,799

ONE-WAY CLUTCH

Adiel Y. Dodge, Rockford, Ill.

Application March 19, 1943, Serial No. 479,695

5 Claims. (Cl. 192—45.1)

This invention relates to a one-way clutch and more particularly to a clutch employing eccentric grippers and so designed that the grippers will engage quickly under all conditions of operation.

Clutches have heretofore been proposed employing eccentric grippers which tilt in one direction to engage and in the other direction to disengage. A great deal of difficulty has been encountered, however, in constructing such clutches so that they will engage quickly under all conditions of operation with a minimum of lost motion and so that all of the grippers will engage uniformly. It is one of the objects of the present invention to provide a one-way clutch in which these difficulties are overcome.

It is another object of the invention to provide a one-way clutch in which the grippers are urged into engaged position in response to centrifugal force thereon.

A further object of the invention is to provide a one-way clutch in which the grippers are urged into engagement in response to centrifugal force and further in response to an accelerating or decelerating force in either direction of rotation.

The above and other objects and advantages of the invention will be apparent from the following description, when read in connection with the accompanying drawing, in which:

Figure 1 is a partial transverse section of a one-way clutch embodying the invention; and Figure 2 is a similar view of another construction.

The one-way clutch of Figure 1 connects an outer cylindrical race 10 to an inner cylindrical race 11 and includes a cage having spaced bars 12 and 13 leaving an opening in the circumference of the cage between the bars. In this opening there is mounted a tiltable sprag or gripper 14 having flat sides and arcuate ends curved about spaced centers 15 and 16. It will be noted that the centers are spaced along a line lying at an angle to the center line of the gripper and are arranged symmetrically with respect to the center of the gripper indicated at 17, ignoring the counterweight 25 which will be explained later. Symmetrical sprags of the type so far described are known in the art and in such sprags the centrifugal force is balanced so that there is little tendency to tilt the gripper either into or out of engagement. It will be noted that centrifugal force acts in the direction of a line 18' from the center point 19 and the center of the sprag 17. A line from center 19 passing through the center point 15 to the outer arcuate surface will divide the sprag into two portions which as seen in Figure 1, are of unequal size. Line 18 intersects outer race 10 at the point where gripper 14 and race 10 contact. However, the centrifugal force on the sprag will be approximately balanced about the pressure line 18 due to the fact that the opposite portions have unequal radii of gyration, having their respective centers of gravity at different distances from the axis 19.

Referring to Figure 1, still ignoring counterweight 25, the center of gravity of the left portion of the sprag is indicated at 21 and the center of gravity of the right portion of the sprag is indicated at 22. The respective centers of gyration of the left and right halves are indicated at 23 and 24. From an examination of this figure, it will be readily seen that although the predominant mass of the sprag lies to the left of the pressure line 18, the centrifugal effect on the two sides will be approximately balanced because the center of gravity and center of gyration of the right side lie at a greater radius from the axis 19.

In order to make the sprag responsive to centrifugal force according to the present invention, it is unbalanced about the pressure line 18 so that centrifugal force will tend to tilt it into a position to engage the races. As shown in Figure 1, this is accomplished by attaching a weight 25 to one side of the sprag, the weight preferably being arranged as shown adjacent the outer race. The addition of this weight shifts the center of gravity of the sprag to a point 26 to the right of the pressure line 18 and shifts the center of gravity of the right side to a point 27. Thus with this weight added, the sprag tends to tilt counterclockwise under the influence of centrifugal force into a position engaging the races 10 and 11.

Each of the cross bars 13 is preferably provided with a spring 28 shown as comprising a curved leaf spring having hook portions 29 at its ends connecting it to the cross bar and engaging the sprag in its center to urge the sprag counterclockwise. It will further be noted that the cross bar 13 engages the sprag below its main center of gravity while the cross bar 12 engages the sprag above its main center of gravity. Thus the sprag is constantly urged toward engaged position by the spring 28 and will be urged into engagement by the cross bars in response to accelerating or decelerating forces.

Considering that the cage is being accelerated in a clockwise direction, the inertia of the sprag tends to cause it to move more slowly than the cage so that the cross bar 13 will engage the sprag on its left side below center and tend to tilt it counterclockwise. Similarly, acceleration of the cage in a counterclockwise direction will cause the cross bar 12 to engage the sprag above its center to tilt it into engaged position. Deceleration of the cage clockwise will have the same effect as acceleration counterclockwise and vice versa, so that the sprag will be urged into engagement in response to acceleration or deceleration in either direction. This effect added to the centrifugal action on the sprag insures that it will engage the races quickly under all conditions and since each sprag is acted on uniformly by acceleration and centrifugal forces all of the sprags in an assembly will engage evenly.

Figure 2 illustrates an alternative construction of the sprag or gripper, the other parts in this figure corresponding to like parts in Figure 1 being designated by the same reference numerals. The sprag or gripper of Figure 2 has flat sides 31 connected by an outer arcuate surface 32 curved about a center 33 and an inner arcuate surface 34 curved about a center 35. The centers 33 and 35 are spaced along a line lying at an angle to the center line of the gripper and whose mid point between the centers lies at one side of the center line of the gripper. The pressure line of this sprag connecting its point of contact with the outer race to the axis of the races is indicated at 36 and divides the sprag in such a way that the major portion of its mass lies on its right side. Also, the center of gravity of the sprag shown at 37 lies to the right of the pressure line 36 and since the center of gravity of the right side of the sprag at 38 is at a greater radius than the center of gravity of its left side at 39, the sprag will tend to tilt counterclockwise ino engagement with the races in response to centrifugal force. This construction, therefore, operates in the same manner as that shown in Figure 1 but eliminates the necessity for external weights on the sprags and substantially simplifies the construction.

While two embodiments of the invention have been shown and described in detail, it will be understood that these are illustrative only and are not intended as a definition of the scope of the invention, reference being had for this purpose to the appended claims.

What is claimed is:

1. A one-way clutch comprising inner and outer coaxial races and grippers mounted between the races having substantially flat parallel sides and arcuate ends curved about centers spaced different distances from the centers of the grippers, the grippers being tiltable in one direction to connect the races and in the other direction to disconnect the races and being so balanced that a majority of their mass lies on one side of lines extending between their respective points of contact with the outer race and the axis of the races so that they tend to tilt in a direction to connect the races under the action of centrifugal force.

2. A one-way clutch comprising inner and outer coaxial races and grippers mounted between the races having substantially flat parallel sides and arcuate ends curved about centers spaced different distances from the centers of the grippers along lines at an angle to the center lines of the grippers respectively, the mid point of each of the lines between the centers lying closer to one side of the gripper than to the other and one of said centers lying substantially on the center line of the gripper.

3. A one-way clutch comprising inner and outer coaxial races, a cage between the races formed with circumferentially spaced cross bars defining a series of openings, tiltable grippers mounted in the openings tiltable to one position in which they engage the races and to another position in which they disengage the races, said grippers being so balanced that they tend to tilt into engagement in response to centrifugal force, and the cross bars on the cage engaging the grippers at different radial positions on their opposite sides to urge them into engagement with the races in response to either an accelerating or decelerating force.

4. A one-way clutch comprising inner and outer coaxial races, a cage between the races formed with circumferentially spaced cross bars defining a series of openings, tiltable grippers mounted in the openings tiltable to one position in which they engage the races and to another position in which they disengage the races, said grippers being so balanced that they tend to tilt into engagement in response to centrifugal force, the cross bars on the cage engaging the grippers at different radial positions on their opposite sides to urge them into engagement with the races in response to either an accelerating or decelerating force, and springs carried by certain of the cross bars engaging the grippers to urge them into engagement with the races.

5. A one-way clutch comprising inner and outer coaxial races, a cage between the races formed with circumferentially spaced cross bars defining a series of openings, tiltable grippers mounted in the openings tiltable to one position in which they engage the races and to another position in which they disengage the races, each of the grippers having flat parallel sides and arcuate ends curved about centers spaced eccentrically different distances from the center of the gripper, and the cross bars on the cage engaging the grippers at different radial positions on their opposite sides to urge them into engagement with the races in response to either an accelerating or decelerating force.

ADIEL Y. DODGE.